United States Patent [19]

Tanaka

[11] Patent Number: 5,365,373
[45] Date of Patent: Nov. 15, 1994

[54] LIGHT INTERCEPTING APPARATUS OF LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 74,423

[22] Filed: Jun. 10, 1993

[30] Foreign Application Priority Data

Jun. 11, 1992 [JP] Japan .......................... 4-040008[U]

[51] Int. Cl.$^5$ ............................................. G02B 27/00
[52] U.S. Cl. ................................... 359/601; 359/612; 359/698; 359/823; 354/195.12
[58] Field of Search ............... 359/600, 601, 607, 611, 359/612, 694, 695, 696, 697, 698, 699, 700, 823, 824, 825, 513, 474, 477; 354/195.12, 233

[56] References Cited

U.S. PATENT DOCUMENTS

| | | | |
|---|---|---|---|
| 2,197,184 | 4/1940 | Kemp | 359/611 |
| 2,218,884 | 10/1940 | Kellner | 359/611 |
| 2,350,110 | 5/1944 | Hood | 359/612 |
| 2,498,581 | 2/1950 | Rogers | 359/612 |
| 3,891,314 | 6/1975 | Lakin et al. | 359/698 |
| 4,183,661 | 1/1980 | Ohkura | 355/61 |
| 4,441,794 | 4/1984 | Field | 359/611 |
| 4,497,549 | 2/1985 | Yurdin et al. | 359/612 |
| 4,911,542 | 3/1990 | Nishio et al. | 359/825 |
| 5,033,819 | 7/1991 | Tanaka | 359/823 |
| 5,034,762 | 7/1991 | Kohmoto | 354/195.12 |
| 5,079,577 | 1/1992 | Nomura | 354/233 |
| 5,115,350 | 5/1992 | Tanaka | 359/823 |

*Primary Examiner*—Loha Ben
*Assistant Examiner*—Michael A. Papalas
*Attorney, Agent, or Firm*—Sandler Greenblum & Bernstein

[57] ABSTRACT

A light intercepting apparatus of a lens barrel is provided in which at least two lens assemblies, provided in the lens barrel, are adjustable in an optical axis direction. The apparatus includes a cylindrical light intercepting member which isolates a light path, defined between the lens assemblies, from outside light, wherein the light intercepting member is expandable and contractable in accordance with the relative movement of the lens assemblies. The apparatus further includes a holding member which holds an end of the light intercepting member so that the light intercepting member may be expanded or contracted.

15 Claims, 3 Drawing Sheets

LIGHT INTERCEPTING APPARATUS OF LENS BARREL

BACKGROUND OF THE INVENTION

1. Field of the Invention

The present invention relates to a light intercepting apparatus of a lens barrel, such as a picture taking lens barrel or a zoom lens barrel of a camera.

2. Description of Related Art

In a lens of a conventional camera, such as a taking lens, in which a plurality of lens assemblies are moved in relation to one another, light intercepting flanges are usually provided on holders holding the respective lens assemblies. The holders are juxtaposed or overlapped to thereby intercept the light paths between the lens assemblies. It is necessary for the light intercepting flanges to be long enough to overlap when the lens assemblies are located in the most distant position.

However, long light intercepting flanges increase the axial length of the lens barrel, preventing the realization of a compact camera.

Conversely, if the axial lengths of the light intercepting flanges are designed to overlap only when the lens assemblies are in their closest position, the light intercepting flanges will not overlap in the most distant position of the lens assemblies, resulting in a failure of light interception.

SUMMARY OF THE INVENTION

The primary object of the present invention is to provide a small and simple light intercepting apparatus which can effectively intercept harmful light entering a lens barrel, regardless of the distance between lens assemblies, without increasing an axial length of the lens barrel.

In the present invention, light interception is not carried out by way of two or more light intercepting flanges which are arranged in an overlapping fashion. Instead, the basic concept of the present invention is the provision of a light intercepting member between the associated lens assemblies, which can be elastically deformed in accordance with a change in distance between the lens assemblies.

To achieve the object mentioned above, according to the present invention, a light intercepting apparatus of a lens barrel is provided in which at least two lens assemblies, provided in the lens barrel, are adjustable in an optical axis direction. The apparatus includes a cylindrical light intercepting member which isolates a light path, defined between the lens assemblies, from outside light. The light intercepting member is elastically expandable and contractable in accordance with the relative movement of the lens assemblies. The apparatus further includes a holding member, which holds an end of the light intercepting member so that the light intercepting member may be expanded or contracted.

The light intercepting member can be, for example, a flexible bellows which can be elastically contracted and stretched.

According to another aspect of the present invention, a light intercepting apparatus of a lens barrel is provided in which distances between at least two lens assemblies, provided in the lens barrel, are adjustable. The apparatus includes a mechanism for enclosing a light path defined between the lens assemblies, a mechanism for connecting the enclosing mechanism to the associated lens assemblies, and a mechanism for absorbing a change in distance between the lens assemblies to maintain enclosure of the light path.

The present disclosure relates to subject matter contained in Japanese Utility Model Application No. HEI 4-40008 (filed on Jun. 11, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
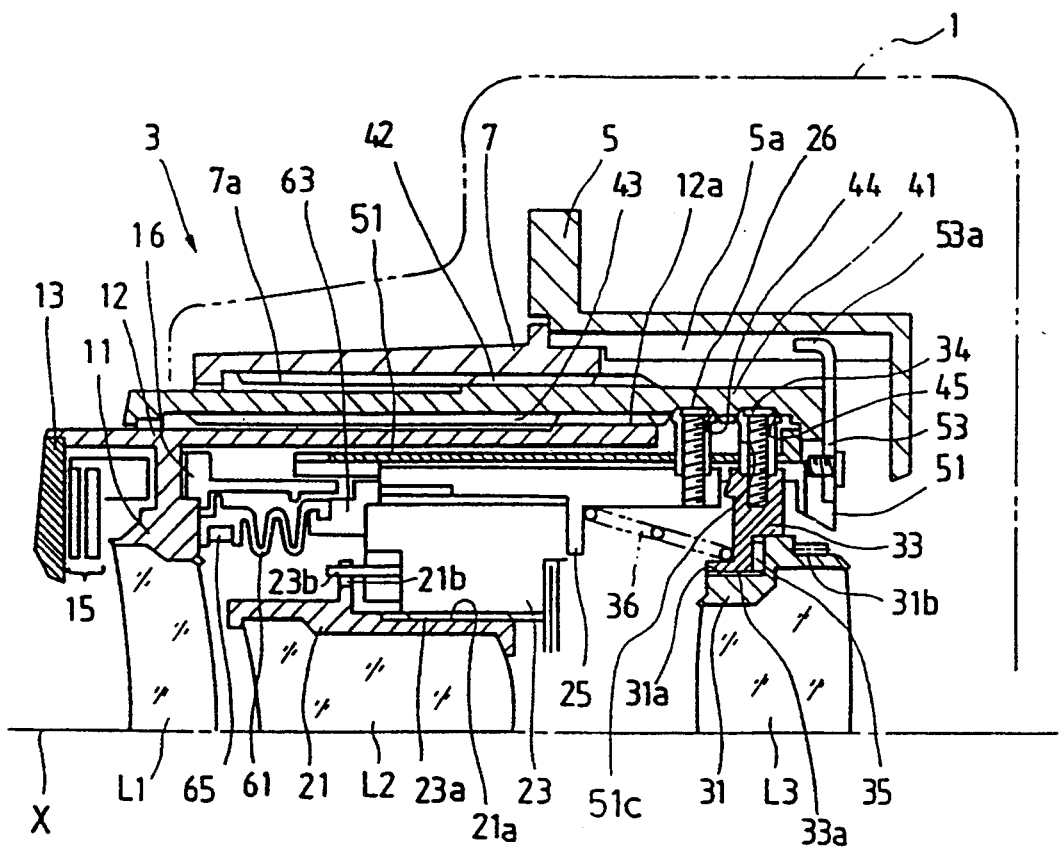
FIG. 1 is a longitudinal sectional view of an upper half of a zoom lens of a lens shutter type camera to which a light intercepting apparatus according to the present invention is applied, shown with the lens assemblies in closest proximity.
Figure 2:
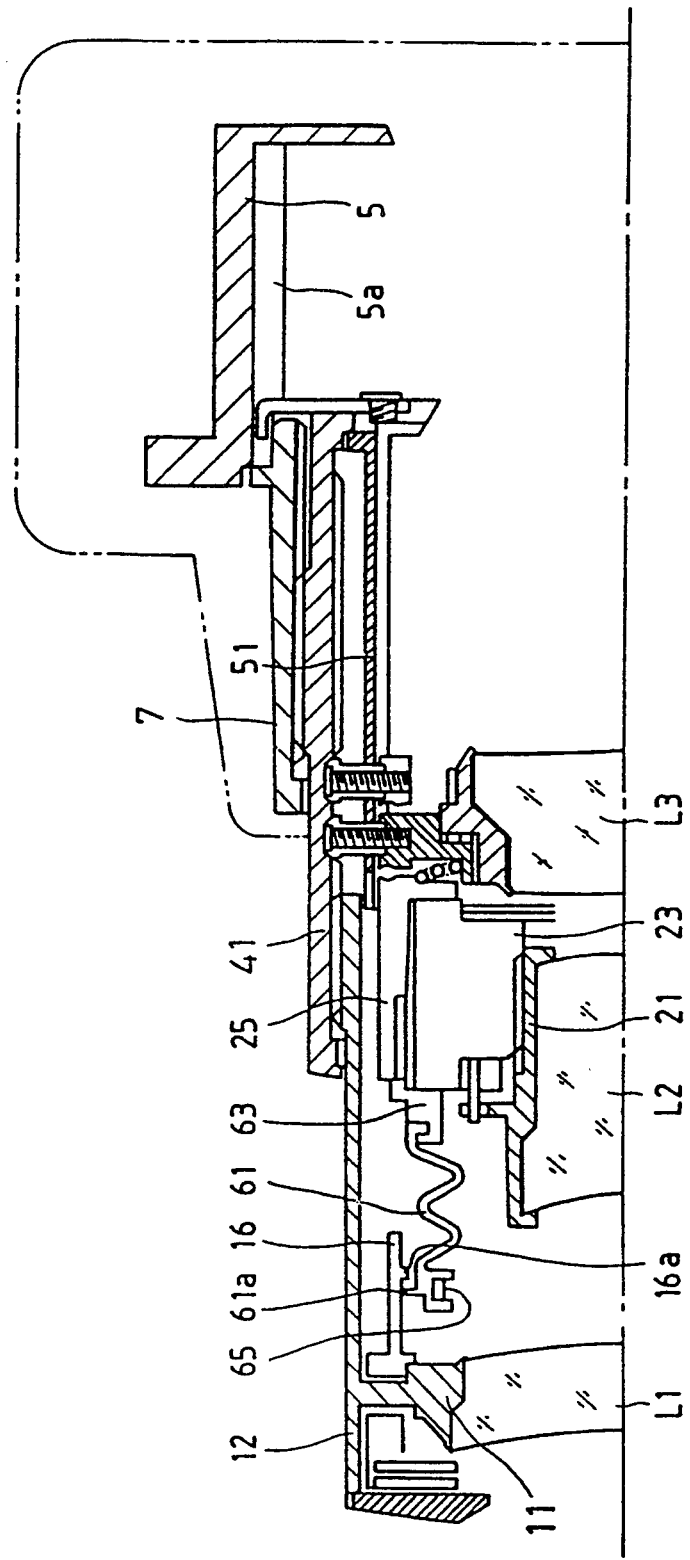
FIG. 2 is a longitudinal sectional view, similar to FIG. 1, but shown with the lens assemblies in a position most distant from each other; and, FIG. 3 is an exploded perspective view of the zoom lens shown in FIG. 1.

FIGS. 1 and 2 show longitudinal sectional views of a zoom lens having a light intercepting apparatus, according to the present invention, taken along an optical axis of a lens barrel thereof.

A lens shutter type camera has a camera body 1 and a zoom lens 3 integral therewith. The zoom lens 3 includes three lens assemblies, or groups, L (i.e., first, second and third lens assemblies L1, L2 and L3). The lens assemblies L are held by a cylindrical stationary member 5 secured to the camera body 1, and a helicoid ring 7 which is attached to the stationary member 5. The helicoid ring 7 is rotated relative to the stationary member 5 to carry out back-focus adjustment. After the back-focus adjustment is completed, the helicoid ring 7 is secured to the stationary member 5 by a securing member (not shown).

Provided within the helicoid ring 7, are cam ring 41, first lens barrel 12, linear movement guide ring 51, and second lens assembly moving frame 25, etc.

The first lens barrel 12 is integrally provided, on an inner peripheral front end surface thereof, with a first lens holding frame (i.e., first lens holder) 11 which holds the first lens assembly L1. The first lens barrel 12 is integrally provided, on inner and outer peripheral rear end surfaces thereof, with a helicoid 12a, and a linear movement guide key 12b which extends in the optical axis direction, respectively. The helicoid 12a is screw-engaged by a helicoid 43, formed on the inner peripheral surface of the cam ring 41. The linear movement guide key 12b is slidably fitted in a key way 51a which is formed in the linear movement guide ring 51 to extend in the optical axis direction.

The cam ring 41 is connected to the linear movement guide ring 51 so as to rotate only, without moving in the optical axis direction. A helicoid 42 is provided on the outer peripheral surface of the cam ring 41, and is engaged by a helicoid 7a formed on the inner peripheral surface of the helicoid ring 7. The linear movement guide ring 51 is provided on the rear end thereof with a linear movement guide plate 53 secured thereto by set screws. An outwardly extending guide key 53a, formed on the linear movement guide ring 51, is slidably fitted in a linear movement guide key way 5a, which is formed in the stationary member 5 and extends in the optical axis direction. Consequently, when the cam ring 41 is rotated, the cam ring 41 is moved in the direction of the optical axis X, in accordance with the leads of the helicoids 42 and 7a, while rotating. The linear movement guide ring 51 is moved together with the cam ring 41 in the direction of the optical axis X, in accordance with the linear movement guide key ways 5a, without rotating.

A second lens holding frame (i.e., second lens holder) 21, which holds the second lens assembly L2, is provided on the outer peripheral surface thereof with a helicoid 21a which is screw-engaged by a helicoid 23a formed on the inner peripheral surface of a cylindrical AF/AE unit 23. An engaging projection 21b of the second lens holding frame 21, which extends in the radial direction therefrom, is engaged with an AF drive lever 23b which projects from the AF/AE unit 23 towards an object to be taken. The AF/AE unit 23 is engaged with the cylindrical second lens moving frame 25 and moves together therewith in the optical axis direction. The second lens moving frame 25 is provided, on the outer peripheral surface thereof, with an axially extending guide key 25a (FIG. 3), and on the rear end thereof, with a plurality of guide rollers 26 (note that only one guide roller 26 is shown in FIG. 1) which extend in the radial direction.

Figure 3:
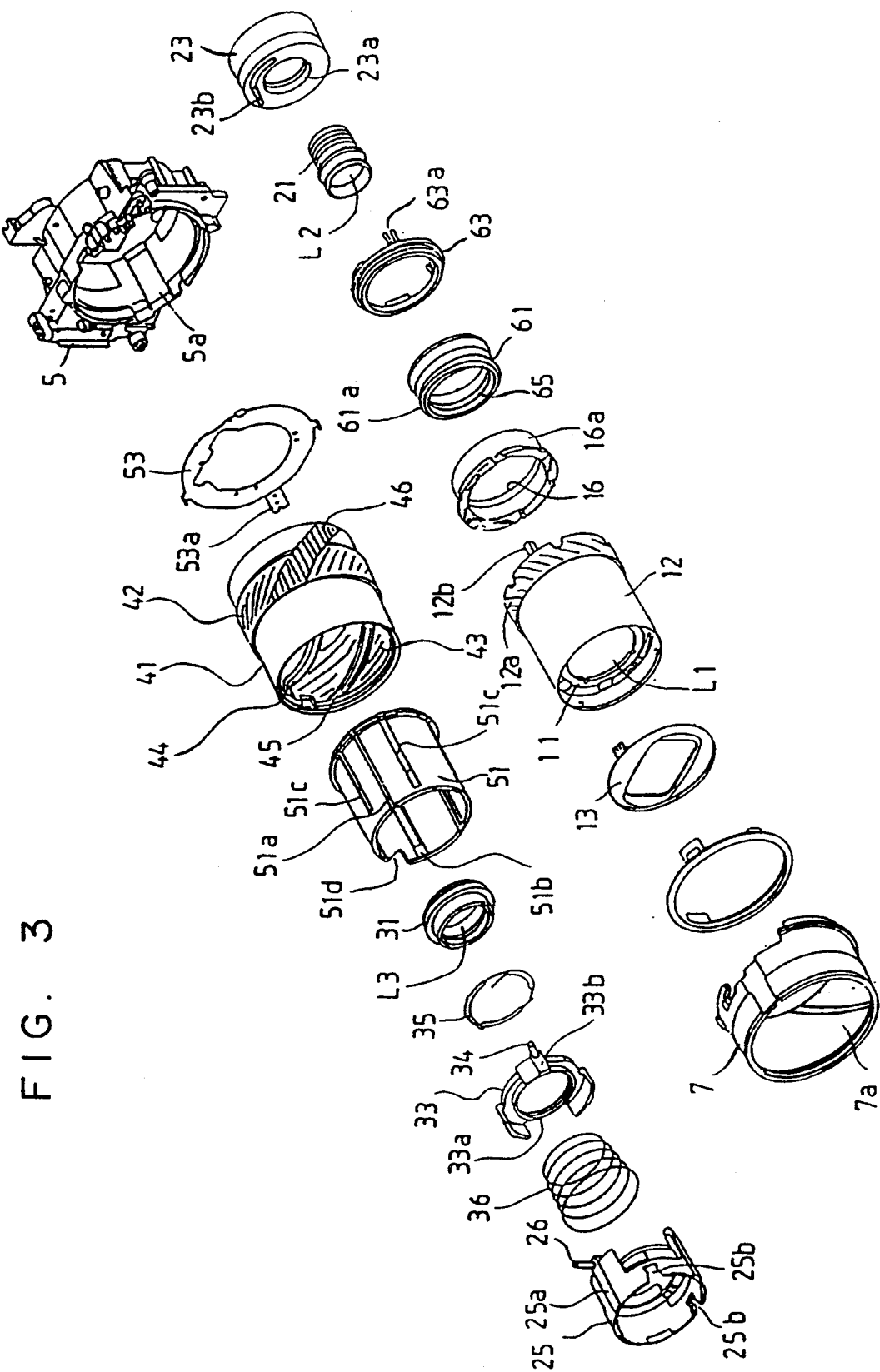

The guide key 25a is slidably fitted in a guide key way 51b which is provided on the inner peripheral surface of the linear movement guide ring 51 to extend in the optical axis direction, so that the second lens moving frame 25 can be moved in the optical axis direction along the guide key way 51b, as shown in FIG. 3. The guide rollers 26 extend through corresponding linear movement guide grooves 51c which are formed in the linear movement guide ring 51 and extend in the optical axis direction, so that the front ends of the guide rollers 26 are fitted in a second lens cam groove 44 formed on the inner peripheral surface of the cam ring 41. The front ends of the guide rollers 26 and the second lens cam groove 44 are tapered, so that the cam ring 41 can be molded by plastics.

A third lens holding frame (i.e., third lens holder) 31, which holds the third lens assembly L3, is provided on the outer peripheral surface thereof with a threaded portion 31a which is in mesh with a threaded portion 33a formed on the inner peripheral surface of a third lens moving frame 33. The third lens moving frame 33 is provided on the outer peripheral surface thereof with three supports 33b (FIG. 3), each having a guide roller 34 mounted thereto. The guide rollers 34 (note that only one guide roller is shown in FIG. 3) extend through the corresponding linear movement guide grooves 51c of the linear movement guide ring 51, so that the front ends of the guide rollers 34 can be fitted in a third lens cam groove 45 formed on the inner peripheral surface of the cam ring 41. The front ends of the guide rollers 34 and the third lens cam groove 45 are tapered, so that the cam ring 41 can be molded from plastics.

An annular leaf spring 35 is provided between the third lens holding frame 31 and the third lens moving frame 33 to increase the distance therebetween to thereby prevent an accidental displacement thereof during the focusing operation, etc. A coil spring 36 is provided between the second lens moving frame 25 and the third lens moving frame 33 to press the tapered surfaces of the guide rollers 26 and 34 against the tapered surfaces of the cam grooves 44 and 45, thereby eliminating a clearance therebetween during the focusing operation.

The third lens holding frame 31 is provided, on the outer peripheral surface of a rear end thereof, with a gear 31b which is adapted to adjust the focus upon assembly. When the gear 31b is rotated by a gear of a focus adjusting jig (not shown), which engages with the gear 31b, the third lens holding frame 31 is slightly moved in the optical axis direction in accordance with the leads of the threaded portions 31a and 33a.

A decoration plate 13 is secured to the front end of the first lens barrel 12. A lens protecting barrier 15 is provided between the decoration plate 13 and the first lens holding frame 11.

The barrier actuating ring 16 is rotatable relative to the first lens barrel 12 through a bayonet mount (not shown), and comes into sliding contact with an oblique surface 51d, defined by a recess formed on the linear movement guide ring 51, to rotate.

The zoom lens 3, as constructed above, operates as follows.

The cam ring 41 is rotated by a zoom motor (not shown) through a gear train (not shown), one of which is in mesh with the gear 46 formed on the outer peripheral surface of the cam ring 41 to transmit the rotation of the zoom motor. The rotation of the cam ring 41 causes the axial movement thereof in accordance with the leads of the helicoids 43 and 7a. Consequently, the linear movement guide ring 51 is axially moved together with the cam ring 41 in accordance with the profile of the linear movement guide key way 5a. The first lens barrel 12 is moved together with the cam ring 41. During the movement, relative movement of the first lens barrel and the cam ring 41 in the optical axis direction also occurs, in accordance with the leads of the helicoids 12a and 43.

The second lens moving frame 25 and the third lens moving frame 33 are moved together with the linear movement guide ring 51. During the movement, movement of the second lens moving frame 25 and the third lens moving frame 33, relative to the linear movement guide ring 51, also takes place, owing to the cam grooves 44 and 45 which restrict the movement of the second lens moving frame 25 and the third lens moving frame 33, respectively. Consequently, the first, second and third lens assemblies 13, which are respectively held by the first lens barrel 12, the second lens moving frame 25, and the third lens moving frame 33, are moved in the optical axis direction while changing the distance therebetween to effect the zooming.

The following discussion will be directed to a light intercepting apparatus according to the present invention.

In the illustrated embodiment, a light intercepting apparatus is provided in which the optical path between the first lens assembly L1 and the second lens assembly L2 is isolated from outside light. A light intercepting member 61, having a circular cross-section in a direction perpendicular to the optical axis, is provided between the first lens holding frame 11 and the second lens holding frame 25. The light intercepting member 61 is made of an elastic or flexible black-colored material having a low reflectance. Alternatively, it is possible to coat the light intercepting member 61 with an anti-reflecting material. The cross-sectional shape of the light intercepting member 61 is not limited to a circle, and can be, for example, an ellipse or a polygon, etc.

The light intercepting member 61 is provided on the rear and front ends thereof with a mounting ring 63 secured thereto, and a reinforcing ring 65 to maintain the shape of the light intercepting member 61, respectively. The mounting ring 63 is provided with a plurality of flexible claws 63a, which are fitted in corresponding grooves 25b formed in the second lens moving frame 25, to secure the mounting ring 63 to the latter.

The front end of the light intercepting member 61 is received within an internal flange of the barrier actuating ring 16. The light intercepting member 61 is provided, on the outer peripheral surface of a front end thereof, with an engaging flange 61a which serves as a stop. The barrier actuating ring 16 is also provided on the inner peripheral surface thereof with an engaging flange 16a which serves as a stop. Consequently, the engaging flange 61a of the light intercepting member 61 comes into sliding contact with the inner peripheral surface of the barrier actuating ring 16 to intercept light, which would otherwise enter therethrough. When the first and second lens assemblies L1 and L2 are spaced at the most distant position, the engaging flange 61a of the light intercepting member 61 engages with the engaging flange 16a of the barrier actuating ring 16 to prevent the light intercepting member 61 (or the reinforcing ring 65) from coming out of (being disengaged from) the barrier actuating ring 16.

The light intercepting member 61 operates as follows during zooming.

In FIG. 1, which shows a wide angle extremity position, the first and second lens assemblies L1 and L2 are located at the closest position. At the wide angle extremity, the first lens holding frame 11 abuts against the reinforcing ring 65 provided at the front end of the light intercepting member 61 and compresses the light intercepting member 61. In this state, the barrier actuating ring 16 is overlapped on the light intercepting member 61, and the front end of the light intercepting member 61 abuts against the first lens holding frame 11. Consequently, the light path between the first lens assembly L1 and the second lens assembly L2 is completely enclosed by the light intercepting member 61, thus isolating the light path from outside light.

When the first and second lens assemblies L1 and L2 are projected towards the telephoto position, increasing the distance therebetween, the light intercepting member 61 is returned to a relaxed state, i.e., a state in which the member is neither expanded nor contracted, by the elastic restoring force thereof. During further movement of the first and second lens assemblies L1 and L2, the first lens assembly L1 comes farther away from the second lens assembly L2, while maintaining contact with the engaging flange 61a of the light intercepting member 61, which is maintained in the relaxed state with the inner peripheral surface of the barrier actuating ring 16. Namely, the barrier actuating ring 16 partially overlaps the light intercepting member 61. Accordingly, the light path between the first lens assembly L1 and the second lens assembly L2 is completely enclosed by the light intercepting member 61, thereby isolating the light path from outside light.

When the first lens assembly L1 comes farthest from the second lens assembly L2, the engaging flange 16a of the barrier actuating ring 16 engages with the engaging flange 61a of the light intercepting member 61 and stretches the latter beyond the relaxed state. Nevertheless, the disengagement of the light intercepting member 61, from the barrier actuating ring 16, is prevented by the engagement of engaging flanges 16a and 61a. Accordingly, the light path between the first lens assembly L1 and the second lens assembly L2 is still completely enclosed in and by the light intercepting member 61, thereby isolating the light path from outside light.

As can be seen from the above discussion, according to the present invention, when the first and second lens assemblies L1 and L2 move close to each other, the light intercepting member 61, which can be elastically deformed and restored, is contracted to permit the first and second lens assemblies L1 and L2 to come to the closest position. Furthermore, since the light intercepting member 61 partially overlaps the barrier actuating ring 16, regardless of the distance between the first and second lens assemblies L1 and L2, the light path between the first and second lens assemblies L1 and L2 can be enclosed by the light intercepting member 61. In addition to the foregoing, the sliding movement between the light intercepting member 61 and the barrier actuating ring 16 decreases the resistance to the movement of the first and second lens assemblies L1 and L2.

It is possible to secure the opposite ends of the flexible light intercepting member 61 to the first and second lens assemblies L1 and L2 in order to continuously bias the first and second lens assemblies in a direction towards or away from one another by the elastic force of the light intercepting bellows, to thereby prevent accidental displacement of the lens assemblies.

Although the above discussion has been directed to isolation of a light path between the first and second lens assemblies in a camera having three lens assemblies, the application of the present invention is not limited to the illustrated embodiment. For instance, the present invention can also be applied to a different type zoom lens or a single focus lens, etc.

As can be understood from the foregoing, according to the present invention, since a light path between at least two lens assemblies, which approach and move away from one another, is enclosed by an elastically deformable or telescopically contractable light intercepting member, light interception can be assured, regardless of the distance between the lens assemblies, resulting in a realization of a compact and lightweight taking lens,

I claim:

1. A light intercepting apparatus of a lens barrel in which at least two lens assemblies, provided in the lens barrel, are adjustable in an optical axis direction, comprising;

a cylindrical light intercepting member which isolates a light path defined between the lens assemblies from outside light, said light intercepting member being elastically expandable and contractable in accordance with relative movement of the lens assemblies;

a holding member which holds an end of said light intercepting member at one end thereof to one of said at least two lens assemblies, so that said light intercepting member may be expanded or contracted; and a flanged member which is movable together with another of said at least two lens assemblies in the optical axis direction, wherein said light intercepting member comes into sliding contact at another end thereof with said flanged member so as to isolate the light path.

2. A light intercepting apparatus according to claim 1, further comprising lens holders which hold the respective lens assemblies, and are movable in said optical axis direction.

3. A light intercepting apparatus according to claim 2, wherein said light intercepting member is made of an elastic material.

4. A light intercepting apparatus according to claim 3, wherein said light intercepting member is connected at one end thereof to one of said lens holders through said holding member so as to move together with the associated lens assembly.

5. A light intercepting member according to claim 3, wherein said elastic material is a bellows.

6. A light intercepting apparatus according to claim 2, wherein said holding member comprises a mounting ring which is provided on said one end of said light intercepting member and which is provided with a claw which can be engaged by one of said movable lens holders.

7. A light intercepting apparatus according to claim 6, further comprising a reinforcing ring secured to another end of said light intercepting member.

8. A light intercepting apparatus of a lens barrel in which at least two lens assemblies, provided in the lens barrel, are adjustable in an optical axis direction, comprising:

lens holders which hold the respective lens assemblies, and are movable in said optical axis direction;
a cylindrical light intercepting member which isolates a light path defined between the lens assemblies from outside light, said light intercepting member being made of an elastic material and being elastically expandable and contractable in accordance with relative movement of the lens assemblies;
a holding member which holds an end of said light intercepting member so that said light intercepting member may be expanded or contracted, said light intercepting member being connected at one end thereof to one of said lens holders through said holding member so as to move together with the associated lens assembly;
a flanged member which is movable together with another of said at least two lens assemblies in the optical axis direction, wherein said light intercepting member comes into sliding contact at another end thereof with said flanged member so as to isolate the light path.

9. A light intercepting apparatus according to claim 8, wherein said light intercepting member comes into sliding contact at another end thereof with said flanged member so as to isolate the light path.

10. A light intercepting apparatus according to claim 9, further comprising stops provided on said light intercepting member and said flanged member, so that when at least two lens assemblies are moved apart from one another, said stops engage with each other at a predetermined position to prevent said light intercepting member from disengaging with said flanged member.

11. A light intercepting apparatus according to claim 10, wherein said light intercepting member is contracted beyond a free state thereof when said at least two lens assemblies are moved closest to each other.

12. A light intercepting apparatus according to claim 10, wherein said light intercepting member is stretched beyond a free state thereof when said at least two lens assemblies are moved farthest from one another.

13. A light intercepting apparatus according to claim 10, wherein said light intercepting member is maintained in a relaxed state when said at least two lens assemblies are moved beyond a predetermined position to a most distant position.

14. A light intercepting apparatus according to claim 13, wherein said light intercepting member comes into sliding contact with said flanged member during movement of said light intercepting member between the predetermined position and the most distant position, while maintaining the relaxed state thereof.

15. A light intercepting apparatus of a lens barrel in which at least two lens assemblies, provided in the lens barrel, are adjustable in an optical axis direction, comprising:

lens holders which hold the respective lens assemblies, and are movable in said optical axis direction;
a cylindrical light intercepting member which isolates a light path defined between the lens assemblies from outside light, said light intercepting member being elastically expandable and contractable in accordance with relative movement of the lens assemblies; and,
a holding member which holds an end of said light intercepting member so that said light intercepting member may be expanded or contracted, said holding member including a mounting ring which is provided on one end of said light intercepting member and which is provided with a claw which can be engaged by one of said movable lens holders.

* * * * *